United States Patent
Nevo et al.

(10) Patent No.: US 7,193,965 B1
(45) Date of Patent: Mar. 20, 2007

(54) MULTI-WIRELESS NETWORK CONFIGURABLE BEHAVIOR

(75) Inventors: Ron Nevo, Hillsboro, OR (US); Xudong Zhao, Portland, OR (US); Dror Shindelman, Haifa (IL); Michael Vakulenko, Zichron Yaacov (IL); Ephraim Zehavi, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/565,215

(22) Filed: May 4, 2000

(51) Int. Cl.
*H04J 1/16* (2006.01)
*H04J 3/14* (2006.01)

(52) U.S. Cl. ............... 370/230; 370/255; 370/447; 370/461; 370/466

(58) Field of Classification Search ......... 370/229, 370/230, 230.1, 237, 255, 337, 447, 238, 370/461, 466, 231, 468; 709/220, 230
See application file for complete search history.

(56) References Cited

U.S. PATENT DOCUMENTS

| | | | |
|---|---|---|---|
| 5,608,720 A * | 3/1997 | Biegel et al. ............ 370/249 |
| 5,745,485 A * | 4/1998 | Abramson ............... 370/342 |
| 5,787,080 A * | 7/1998 | Hulyalkar et al. ....... 370/310.2 |
| 6,463,470 B1 * | 10/2002 | Mohaban et al. ......... 709/223 |
| 6,484,261 B1 * | 11/2002 | Wiegel ..................... 713/201 |
| 6,633,848 B1 * | 10/2003 | Johnson et al. ........... 704/277 |
| 2002/0136268 A1 | 9/2002 | Gan et al. |

FOREIGN PATENT DOCUMENTS

| | | |
|---|---|---|
| EP | 0 944 176 A1 | 9/1999 |
| EP | 1 220 499 A2 | 7/2002 |
| EP | 1 225 709 A1 | 7/2002 |
| GB | 2 327 016 A | 1/1999 |
| WO | WO 01/35578 A1 | 5/2001 |
| WO | WO 01/76295 A2 | 10/2001 |

OTHER PUBLICATIONS

Negus, K J et al., Home RR TM and Swap: Wireless Networking for the Connected Home. Mobile Computing and Communications Review, vol. 2, NR. 4, pp. 28-36. ACM, New York, New York, United States.

* cited by examiner

*Primary Examiner*—John Pezzlo
*Assistant Examiner*—Inder Pal Mehra
(74) *Attorney, Agent, or Firm*—Blakely, Sokoloff, Taylor & Zafman LLP

(57) ABSTRACT

Techniques for supporting multiple potentially overlapping wireless protocols with a single electronic system are disclosed. In the description that follows, the overlapping protocols are Bluetooth and IEEE 802.11 for wireless networking; however, other overlapping protocols can be supported in a similar manner. A transaction control policy and a collision map are provided to determine which protocol to enable/disable when a conflict arises. Based on the transaction control policy and the collision map, one or more transceivers that operate according to the wireless protocols can be selectively enabled/disabled to avoid actual conflicts.

25 Claims, 6 Drawing Sheets

MULTI-WIRELESS NETWORK CONFIGURABLE BEHAVIOR

FIELD OF THE INVENTION

The present invention relates to the field of wireless communication. More specifically, the present invention relates to the problem of concurrent wireless voice and data communication with multiple communication partners of different wireless communication protocols.

BACKGROUND OF THE INVENTION

Several wireless communications protocols are available for use with electronic systems such as computer systems, personal digital assistants (PDAs), telephones, networks, and other devices. These wireless communications protocols include, but are not limited to, IEEE 802.11 direct sequence spread spectrum, IEEE 802.11 frequency hopping spread spectrum, Bluetooth, Home RF, also known as Shared Wireless Access Protocol (SWAP) and HIPERLAN, which is a European wireless LAN standard.

In many situations, it is desirable for a single electronic system to support multiple wireless communications protocols concurrently. For example, a computer system may support an IEEE 802.11 protocol for wireless networking and Bluetooth for peripheral devices. A telephone system may support Bluetooth and SWAP. Unfortunately, the various protocols can overlap in time and frequency causing conflicts that can result in loss of data or otherwise disrupt operation. Therefore, some technique is desired to resolve conflicts between concurrently operating wireless protocols.

SUMMARY OF THE INVENTION

In one embodiment, an apparatus includes a first transceiver to transmit/receive data according to a first protocol and a second transceiver to transmit/receive data according to a second protocol. A memory to store a transaction control policy to indicate whether the first transceiver transmits/receives or the second transceiver transmits/receives if a conflict exists between the first protocol and the second protocol. A control circuit is coupled to receive at least a portion of the policy from the memory. The control circuit is also coupled to the first transceiver and to the second transceiver, the control circuit selectively enables/disables the first transceiver and the second transceiver according to the transaction control policy.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Techniques for supporting multiple potentially overlapping wireless protocols with a single electronic system are disclosed. Overlapping wireless protocols are two or more protocols in that use, or potentially use, the same frequency at the same time for operation. In the description that follows, the overlapping protocols are Bluetooth and IEEE 802.11 for wireless networking; however, other overlapping protocols can be supported in a similar manner. A transaction control policy and a collision map are provided to determine which protocol to enable/disable when a conflict arises. Based on the transaction control policy and the collision map, one or more transceivers that operate according to the wireless protocols can be selectively enabled/disabled to avoid actual conflicts.

Figure 1:
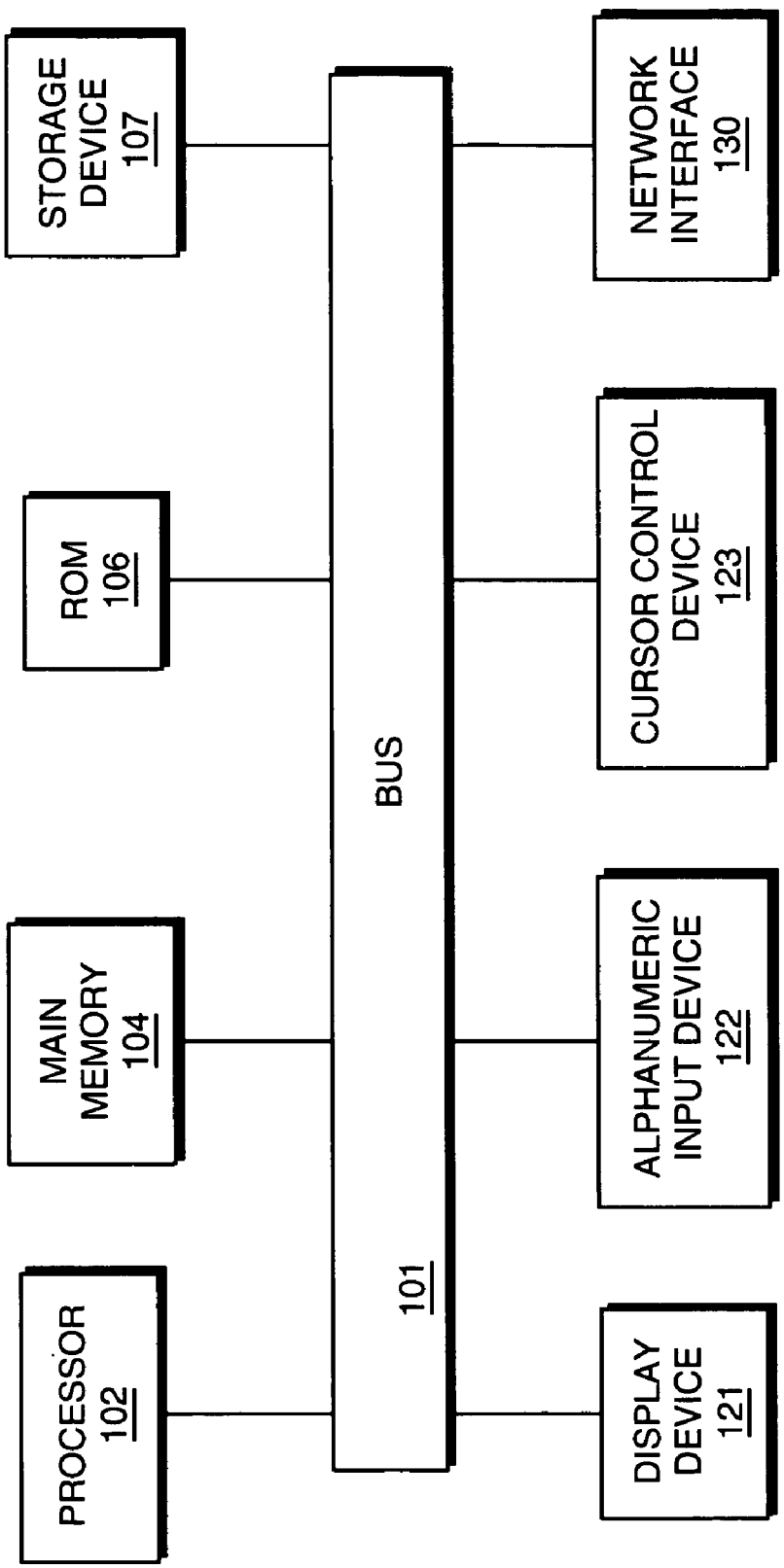
FIG. 1 is a block diagram of one embodiment of an electronic system.

FIG. 1 is a block diagram of one embodiment of an electronic system. The electronic system illustrated in FIG. 1 is intended to represent a range of electronic systems (e.g., desktop computer system, laptop computer system, set top box, personal digital assistant, cordless telephone, cellular telephone). Alternative electronic systems can include more, fewer and/or different components.

Electronic system 100 includes bus 101 or other communication device to communicate information, and processor 102 coupled to bus 101 to process information. While electronic system 100 is illustrated with a single processor, electronic system 100 can include multiple processors and/or co-processors. Electronic system 100 further includes random access memory (RAM) or other dynamic storage device 104 (referred to as main memory), coupled to bus 101 to store information and instructions to be executed by processor 102. Main memory 104 also can be used to store temporary variables or other intermediate information during execution of instructions by processor 102.

Electronic system 100 also includes read only memory (ROM) and/or other static storage device 106 coupled to bus 101 to store static information and instructions for processor 102. Data storage device 107 is coupled to bus 101 to store information and instructions. Data storage device 107 such as a magnetic disk or optical disc and corresponding drive can be coupled to electronic system 100.

Electronic system 100 can also be coupled via bus 101 to display device 121, such as a cathode ray tube (CRT) or liquid crystal display (LCD), to display information to a electronic user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121.

Electronic system 100 further includes network interface 130 to provide access to a network, such as a local area network. In one embodiment, network interface 130 includes one or more transceivers (not shown in FIG. 1) that provide transactions (transmit and/or receive) according to multiple wireless protocols. These wireless protocols include, but are not limited to, IEEE 802.11 direct sequence spread spectrum, IEEE 802.11 frequency hopping spread spectrum, Bluetooth, Home RF, also known as Shared Wireless Access Protocol (SWAP).

Instructions are provided to memory from a storage device, such as magnetic disk, a read-only memory (ROM) integrated circuit, CD-ROM, DVD, via a remote connection (e.g., over a network via network interface 130) that is either wired or wireless, etc. In alternative embodiments, hard-wired circuitry can be used in place of or in combination with software instructions to implement the present invention. Thus, the present invention is not limited to any specific combination of hardware circuitry and software instructions.

A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals).

Figure 2:
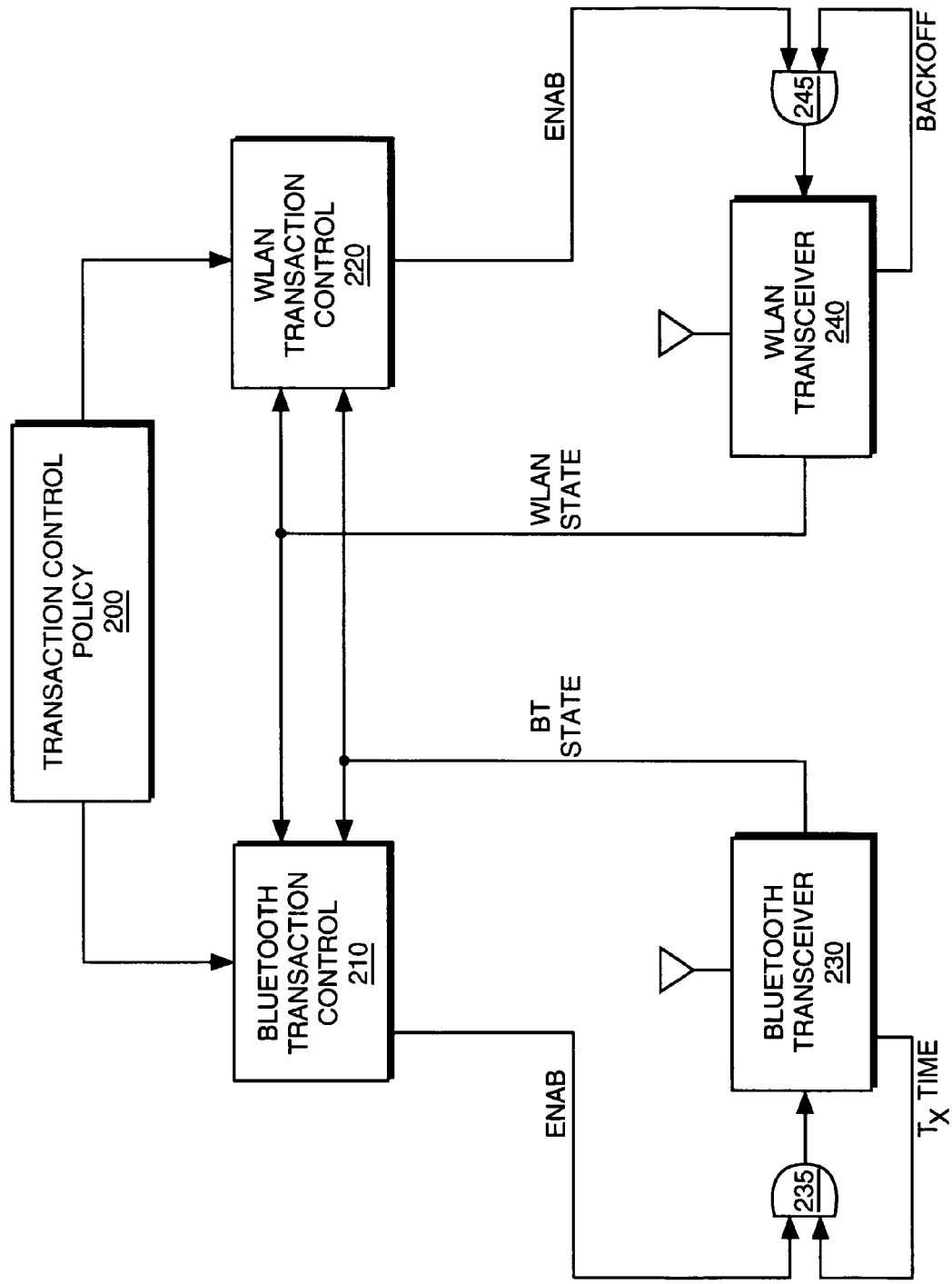
FIG. 2 is a logical diagram of one embodiment of a wireless communications interface supporting IEEE 802.11 and Bluetooth.

FIG. 2 is a logical diagram of one embodiment of a wireless communications interface supporting IEEE 802.11 and Bluetooth. While communication is described in terms of supporting IEEE 802.11 (WLAN) and Bluetooth concurrently, other potentially overlapping protocols can be supported in a similar manner.

Transaction control policy 200 is provided to Bluetooth transaction control 210 and to wireless local area network (WLAN) transaction control 220. Bluetooth transaction control 210 is described in greater detail below with respect to FIG. 3. WLAN transaction control 220 is described in greater detail below with respect to FIG. 5. In one embodiment, transaction control policy 200 is stored in a dynamic memory of an electronic system (e.g., main memory 104 of electronic system 100); however, in alternate embodiments, transaction control policy 200 can be stored in another storage device (e.g., ROM 106 of electronic system 100, a memory (not shown in FIG. 1) within network interface 130 of electronic system 100).

Bluetooth transaction control 210 receives Bluetooth (BT) state information from Bluetooth transceiver 230. Bluetooth transaction control 210 also generates an enable (ENAB) signal that is used to enable and disable Bluetooth transceiver 230. Bluetooth transceiver 230 generates a transaction time (Tx_TIME) signal that indicates valid transaction times for Bluetooth transceiver 230 according to the Bluetooth protocol. In one embodiment ENAB and Tx_TIME are input to AND gate 235. The signal output by AND gate 235 enables/disables Bluetooth transceiver 230. Other logic configurations can be used to accomplish the same result.

WLAN transaction control 220 receives WLAN state information from WLAN transceiver 240. WLAN transaction control 220 also generates an enable (ENAB) signal that is used to enable and disable WLAN transceiver 240. WLAN transceiver 240 generates a backoff (BACKOFF) signal that indicates whether WLAN transceiver 240 should backoff transmitting. In one embodiment ENAB and BACKOFF are input to AND gate 245. The signal output by AND gate 245 enables/disables WLAN transceiver 240. Other logic configurations can be used to accomplish the same result.

Bluetooth state information is provided to WLAN transaction control 220 and WLAN state information is provided to Bluetooth transaction control 210. Based on the state of the opposing transceiver and transaction policy 200, a transceiver can be controlled to operate concurrently with another potentially conflicting protocol in a non-conflicting manner. Control of the various transceivers and transaction policy 200 are described in greater detail below.

Figure 3:
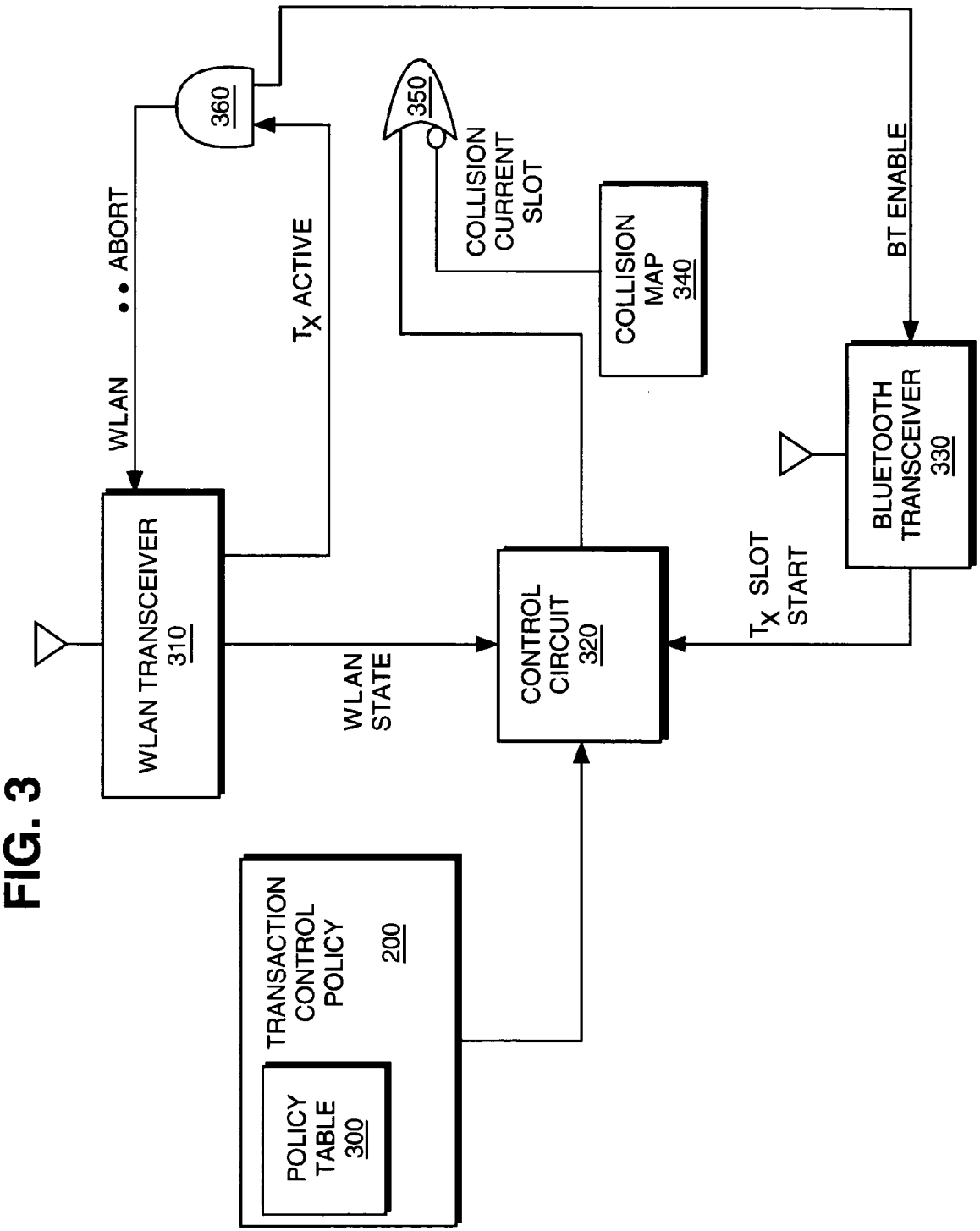
FIG. 3 is a block diagram of one embodiment of a Bluetooth transmission control circuit.

FIG. 3 is a block diagram of one embodiment of a Bluetooth transmission control circuit. In one embodiment transaction control policy 200 is stored in the memory of the electronic device (e.g., main memory 104) that communicates in a wireless manner. In alternate embodiments, policy table can be stored in a local memory (e.g., a memory of network interface 130) or in any other manner.

In one embodiment, transaction control policy 200 is stored in the form of one or more policy tables, such as policy table 300. In one embodiment, control circuit 320 receives a column of policy table 300 for each Bluetooth message to be processed. The column is selected based on the type of Bluetooth message to be processed. One example of policy table 300 is illustrated below in Table 1; however, other tables can also be used. In Table 1, an entry of "1" indicates that the Bluetooth transaction is enabled in the case of a conflict, a "0" indicates that the Bluetooth transaction is disabled in the case of a conflict, and a "X" is a don't care state. For Table 1 as well as the state diagram of FIG. 4, for IEEE 802.11 states, "DCF" refers to "distributed coordinated functions," which are transactions when there is no network master and "PCF" refers to "point coordinated functions," which are transactions when there is a network master. DCF and PCF are known to those skilled in the art and are defined in the IEEE 802.11 standard.

TABLE 1

Transaction control policy Table Example for IEEE 802.11 and Bluetooth.

| State # | Bluetooth Msg. Type IEEE 802.11 State | SCO Tx | SCO Tx Low | Page | Link Estab. | Hold Mode | Sniff Mode | POLL | ACL | SCO Rx | SCO Rx Low |
|---|---|---|---|---|---|---|---|---|---|---|---|
| 401 | DCF IDLE | 1 | 1 | 1 | 1 | 1 | 1 | 1 | 1 | X | X |
| 402 | DCF PL Rx | 1 | 1 | 1 | 1 | 1 | 1 | 1 | 1 | X | X |
| 403 | DCF Rx Current | 1 | 0 | 1 | 1 | 1 | 1 | 0 | 0 | X | X |

TABLE 1-continued

Transaction control policy Table Example for IEEE 802.11 and Bluetooth.

| State # | IEEE 802.11 State | SCO Tx | SCO Tx Low | Page | Link Estab. | Hold Mode | Sniff Mode | POLL | ACL | SCO Rx | SCO Rx Low |
|---|---|---|---|---|---|---|---|---|---|---|---|
| 404 | DCF Rx Other | 1 | 1 | 1 | 1 | 1 | 1 | 1 | 1 | X | X |
| 405 | DCF Rx Broadcast | 1 | 1 | 1 | 1 | 1 | 1 | 0 | 0 | X | X |
| 406 | DCF Tx ACK | 1 | 0 | 0 | 0 | 0 | 0 | 0 | 0 | 1 | 0 |
| 407 | DCF Rx Fragment | 1 | 0 | 0 | 1 | 0 | 0 | 0 | 0 | X | X |
| 408 | DCF Tx | 1 | 0 | 0 | 1 | 0 | 0 | 0 | 0 | 1 | 0 |
| 409 | DCF Rx ACK | 1 | 0 | 0 | 0 | 0 | 0 | 0 | 0 | X | X |
| 410 | DCF Tx Fragment | 1 | 0 | 0 | 1 | 0 | 0 | 0 | 0 | 1 | 0 |
| 411 | PCF Idle | 1 | 1 | 1 | 1 | 1 | 1 | 0 | 0 | X | X |
| 412 | PCF PL Rx | 1 | 0 | 1 | 1 | 1 | 1 | 0 | 0 | X | X |
| 413 | PCF Rx Current | 1 | 1 | 1 | 1 | 1 | 1 | 0 | 0 | X | X |
| 414 | PCF Rx Other | 1 | 1 | 1 | 1 | 1 | 1 | 1 | 1 | X | X |
| 415 | PCF Rx Broadcast | 1 | 1 | 0 | 0 | 0 | 0 | 0 | 0 | X | X |
| 416 | PCF Tx | 1 | 0 | 0 | 0 | 0 | 0 | 0 | 0 | 1 | 0 |

Control circuit 300 selects an entry from the column received based on the WLAN state received from WLAN transceiver 310. A state diagram corresponding to the states of Table 1 is provided in FIG. 4. In one embodiment, WLAN transceiver 310 operates according to IEEE 802.11 protocols; however, other protocols can also be used.

For example, if a Bluetooth message is a SCO transmit (Tx), control circuit 320 receives the column from Table 1 corresponding to SCO Tx. If the IEEE 802.11 WLAN message to be transmitted is a DCF Tx message, control circuit 320 selects the corresponding entry from the column received. In the example of Table 1, the entry is a "1", so control circuit 320 outputs a logical "1" to OR gate 350.

Collision map 340 provides a second input to OR gate 350. Collision map 340 determines the frequency to be used for the Bluetooth message and compares the frequency to the frequency range used for WLAN transmissions. Collision map 340 outputs a signal indicating whether a collision (or conflict) will occur (COLLISION CURRENT SLOT signal). In one embodiment, WLAN transceiver 310 transmits and receives messages using a 22 MHz frequency range centered around a predetermined center frequency. In an alternate embodiment, WLAN transceiver 310 transmits and receives messages using a 16 MHz frequency range; however, other frequency ranges can be used based on, for example, the filtering characteristics used.

The output of OR gate 350 generates an enable (BT ENABLE) signal to Bluetooth transceiver 330, which enables Bluetooth transceiver 330 when asserted. The BT ENABLE signal is also input to AND gate 360. AND gate 360 logically ANDs the BT ENABLE signal with a signal (Tx ACTIVE) from WLAN transceiver 310 that indicates whether WLAN transceiver 310 is currently transmitting a message. AND gate 360 generates the WLAN ABORT signal, which aborts the transmission of WLAN transceiver 310.

In one embodiment, WLAN transceiver 310 also outputs a signal (WLAN STATE) that indicates the state of WLAN transceiver 310. One embodiment of a state diagram describing the states of WLAN transceiver 310 is provided with respect to FIG. 4.

In one embodiment, Bluetooth transceiver 330 generates a Tx SLOT START signal that is provided to control circuit 320 to indicate the start of a message transmission by Bluetooth transceiver 330. Control circuit 320 can use the Tx SLOT START signal, for example, to begin processing of a subsequent message.

Figure 4:
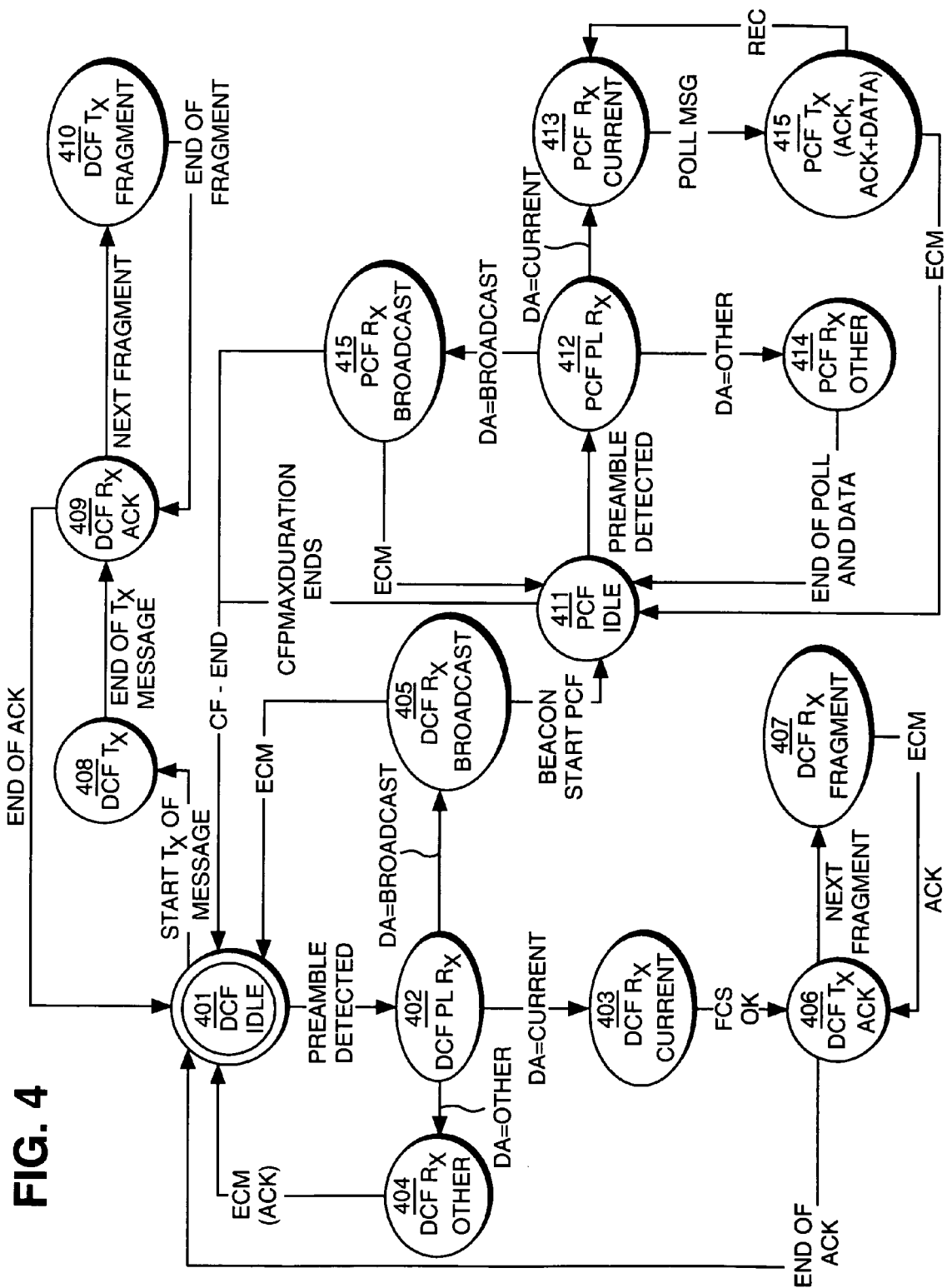
FIG. 4 is one embodiment of a state diagram for a WLAN transceiver.

FIG. 4 is one embodiment of a state diagram for a WLAN transceiver. State 401 is the idle (DCF IDLE) state where the state machine begins operation or the state to which the state machine returns after processing a message. WLAN messages are transmitted in states 408–410.

At the start of a message transmission, the state machine transitions to state 408 (DCF Tx) for transmission of the WLAN message or a fragment of the WLAN message. At the end of the message transmission, the state machine transitions to state 409 (DCF Rx ACK) to receive an acknowledge message from the destination of the transmission of state 408. If all fragments are transmitted, the state machine returns to state 401. Otherwise, the state machine transmits fragments in state 410 (DCF Tx Fragment) and receives acknowledgments in state 409 until the message is completely transmitted.

If a preamble of a message is received in state 401, the state machine transitions to state 402 (DCF PL Rx). If the preamble is a current message, the state machine transitions to state 403 to receive the message or a fragment of the message. The state machine causes an acknowledge message to the message or message fragment to be sent in state 406 (DCF Tx ACK). If additional fragments are to be received, the state machine transitions to state 407 (DCF Rx Fragment). Fragments are received and acknowledged in states 406 and 407 until the message is complete, at which time the state machine returns to state 401.

If, in state 402, the preamble indicates a broadcast message, the state machine transitions to state 405 (DCF Rx Broadcast) to receive the broadcast. If the message is not a Beacon signal, the broadcast message is received in state 405 and the state machine returns to state 401.

If, in state 405, the message is a Beacon signal, the state machine transitions to state 411 (PCF IDLE). The state machine moves to PCF mode, which corresponds to a network master. When a preamble is detected in state 411, the state machine transitions to state 412 (PCF PL Rx). If, in state 412, the preamble is for a broadcast message, the state machine transitions to state 415 (PCF Rx Broadcast) to receive the broadcast message. The state machine then returns to state 411 unless the broadcast message ends the PCF state, in which case the state machine returns to state 401.

If, in state 411, the preamble is for a current message, the state machine transitions to state 413 (PCF Rx Current) to begin receiving the message. Message fragments are received in state 413 and acknowledgments are transmitted in state 416 (PCF Tx) until the end of the message (EOM), when the state machine returns to state 411.

If, in state 411, the message is an "other" type of message, which is for any other type of message, the state machine transitions to state 414 for receipt of the message. The state machine then returns to state 411.

If, in state 402, the message is an "other" type of message, which is for any other type of message, the state machine transitions to state 404 for receipt of the message. The state machine then returns to state 401.

Figure 5:
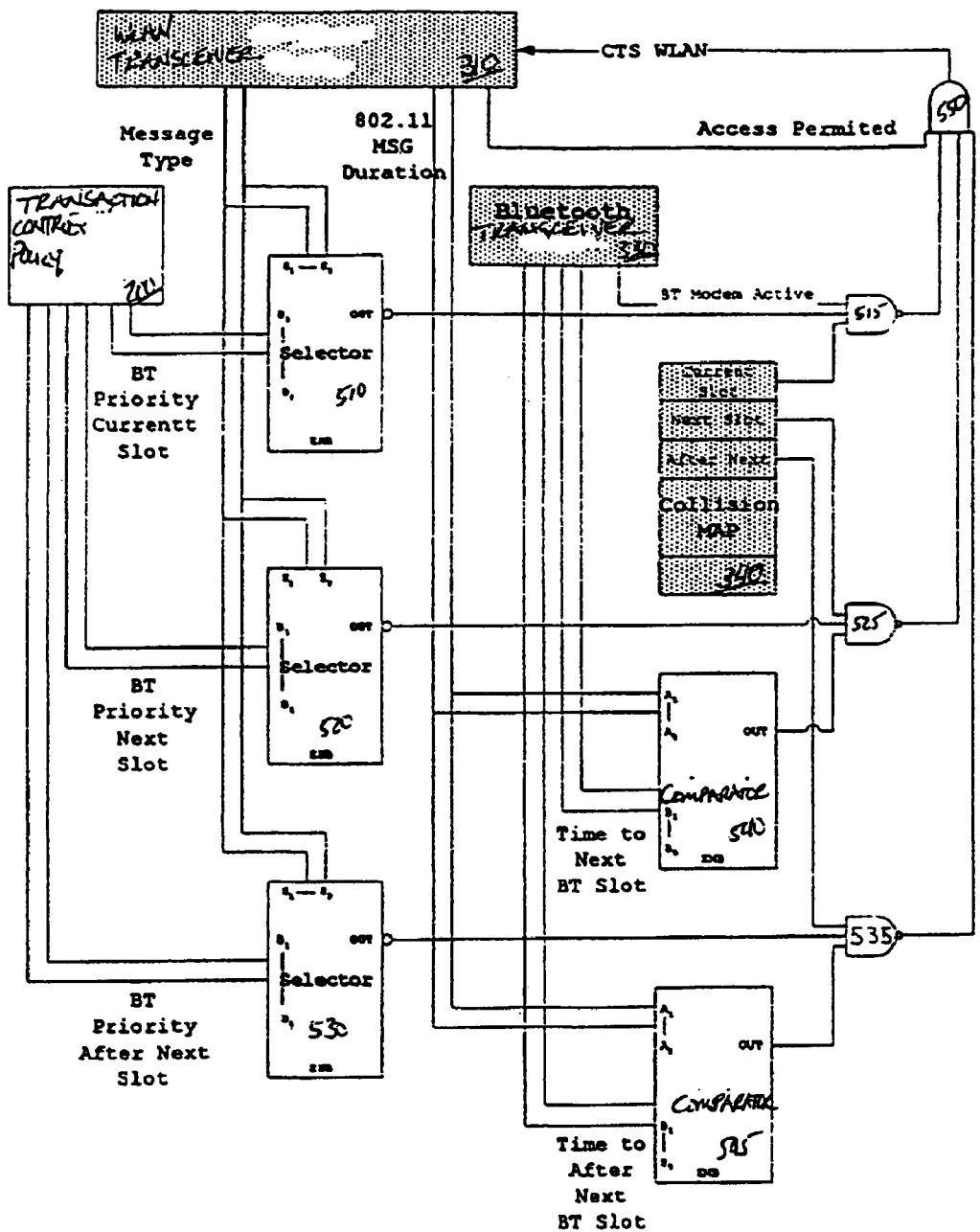
FIG. 5 is a block diagram of one embodiment of an WLAN transmission control circuit.

FIG. 5 is a block diagram of one embodiment of an WLAN transmission control circuit. Transaction control policy 200 provides Bluetooth (BT) priorities corresponding to the Bluetooth messages to be transmitted. In one embodiment, priorities for three Bluetooth messages (the current message, the next message and the subsequent (or after next) message) are used in controlling transmissions by WLAN transceiver 310; however, any number of message priorities can be used in a similar manner. In one embodiment, the Bluetooth priorities are columns from Table 1. In alternate embodiments, Bluetooth priorities can be determined in another manner. The Bluetooth priorities are input to selectors 510, 520, and 530.

The message type of the WLAN message is used to provide the selection signals for selectors 510, 520, and 530. The selection signals select the entry in the column corresponding to the WLAN message type. The output signal from selectors 510, 520, and 530 are the entries from Table 1 that correspond to the Bluetooth column and the WLAN row. The output signals from selectors 510, 520, and 530 are input to AND gates 515, 525 and 535, respectively.

AND gates 515, 525 and 535 also receive entries from collision map 340 for the current Bluetooth slot, the next Bluetooth slot and the after next Bluetooth slot, respectively. The respective entries from collision map 340 indicate whether a conflict exists for the WLAN message and the current Bluetooth slot, the next Bluetooth slot and the after next Bluetooth slot.

AND gate 515 receives, as a third input (BT Modem Active) signal, an indication of whether Bluetooth transceiver 330 is active. The WLAN message duration and the time to the next Bluetooth slot are input to comparator 540. Similarly, the WLAN message duration and the time to the after next Bluetooth slot are input to comparator 545. The output signals from comparators 540 and 545 are input to AND gates 525 and 535, respectively.

The output signals generated by AND gates 515, 525 and 535 indicate whether a conflict exists between the WLAN message and a current Bluetooth message as well as the next Bluetooth message and the after next Bluetooth message if the WLAN message is long enough to overlap multiple Bluetooth messages. AND gate 550 receives, as input signals, the output signals from AND gates 515, 525 and 535 as well as an Access Permitted signal from WLAN transceiver 310. The Access Permitted signal indicates whether WLAN transceiver 310 can be disabled because of a conflict with a Bluetooth message.

If no conflicts exist, based on transaction control policy 200, collision map 340 and the timing information WLAN transceiver 310 is enabled by AND gate 550. If a conflict exists, WLAN transceiver 310 is disabled by AND gate 550.

Figure 6:
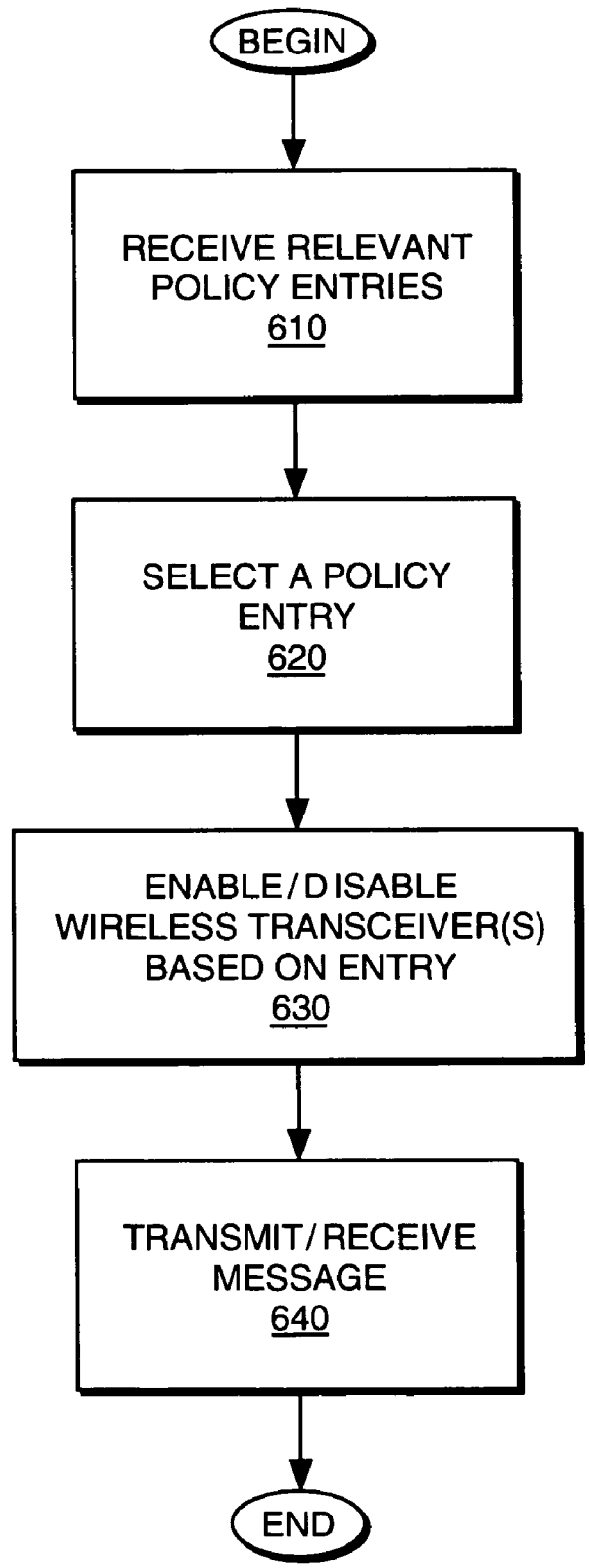
FIG. 6 is a flow diagram for concurrent transmissions of voice and/or data according to two possibly conflicting protocols.

FIG. 6 is a flow diagram for concurrent transmissions of voice and/or data according to two possibly conflicting protocols. Relevant policy entries are received at 610. In one embodiment, a selected column from a policy table is received. The column can be selected, for example, based on a type of message (e.g., Bluetooth SCO transmission, IEEE 802.11 DCF transmission), or on other criteria. In an alternate embodiment, a complete policy table can be received.

A policy entry from the relevant policy entries is selected at 620. In one embodiment, a type of message to be transmitted can be used to select the specific entry to be used. For example, if the type of Bluetooth message is used to select the relevant entries, the type of WLAN message is used to select the entry from the relevant entries. The reverse can also be used. That is, if the type of WLAN message is used to select the relevant entries, the type of Bluetooth message is used to select the entry from the relevant entries.

One or more wireless transceivers are enabled or disables based, at least in part, on the selected entry at 630. For example, if both a WLAN message and a Bluetooth message are to be transmitted at the same time and on overlapping frequencies, one of the WLAN transceiver and the Bluetooth transceiver is enabled and the other transceiver is disabled. The message(s) are transmitted/received at 640.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
 a first transceiver to transmit/receive data according to a first wireless communication protocol;
 a second transceiver to transmit/receive data according to a second wireless communication protocol;
 a memory to store a transaction control policy to indicate whether the first transceiver transmits/receives or the second transceiver transmits/receives if a conflict exists between the first wireless communication protocol and the second wireless communication protocol; and
 a control circuit coupled with the memory to receive at least a portion of the transaction control policy from the memory, wherein the portion of the transaction control policy received is based, at least in part, on a type of message to be transmitted by the first transceiver, wherein the control circuit is also coupled with the first transceiver and with the second transceiver, the control circuit to selectively enable/disable the first transceiver and to selectively enable/disable the second transceiver according to the portion of the transaction control policy.

2. The apparatus of claim 1 wherein the transaction control policy comprises a policy table and the apparatus further comprises a collision map.

3. The apparatus of claim 1 wherein the portion of the transaction control policy includes a set of entries, the control circuit to select an entry from the set of entries based on the state of the second transceiver, wherein the control circuit further comprises facilities to selectively enable/disable the first transceiver and to selectively enable/disable the second transceiver according to the selected entry.

4. The apparatus of claim 1, wherein the first wireless communication protocol and the second wireless communication protocol comprise different ones of the following protocols: IEEE 802.11 direct sequence spread spectrum, IEEE 802.11 frequency hopping spread spectrum, Bluetooth, SWAP and HIPERLAN.

5. The apparatus of claim 1, wherein the first wireless communication protocol comprises a synchronous protocol and the second wireless communication protocol comprises an asynchronous protocol.

6. An apparatus comprising:
a transceiver to transmit/receive data according to a first wireless communication protocol and to transmit/receive data according to a second wireless communication protocol;
a memory to store a transaction control policy to indicate whether the transceiver transmits/receives according to the first wireless communication protocol or according to the second wireless communication protocol if a conflict exists between the first wireless communication protocol and the second wireless communication protocol; and
a control circuit coupled with the memory to receive at least a portion of the transaction control policy from the memory, wherein the portion of the transaction control policy received is based, at least in part, on a type of message to be transmitted according to the first wireless communication protocol, wherein the control circuit is also coupled with, said transceiver, the control circuit to selectively enable/disable said transceiver according to the portion of the transaction control policy.

7. The apparatus of claim 6 wherein the transaction control policy comprises a policy table and the apparatus further comprises a collision map.

8. The apparatus of claim 6 wherein the portion of the transaction control policy includes a set of entries, the control circuit to select an entry from the set of entries based on a type of message to be transmitted according to the second wireless communication protocol, wherein the control circuit further comprises facilities to selectively enable/disable said transceiver according to the selected entry.

9. The apparatus of claim 6, wherein the first wireless communication protocol and the second wireless communication protocol comprise different ones of the following protocols: IEEE 802.11 direct sequence spread spectrum, IEEE 802.11 frequency hopping spread spectrum, Bluetooth, SWAP and HIPERLAN.

10. The apparatus of claim 6, wherein the first wireless communication protocol comprises a synchronous protocol and the second wireless communication protocol comprises an asynchronous protocol.

11. A method comprising:
selecting a subset of entries from a set of entries that comprise a transaction policy, the selection based, at least in part, on a type of message to be processed according to a first wireless communication protocol;
selecting an entry from the subset of entries based, at least in part, on a type of message to be transmitted according to a second wireless communication protocol; and
controlling messages according to the first wireless communication protocol and messages according to the second wireless communication protocol based, at least in part, on the selected entry.

12. The method of claim 11, wherein messages according to the first wireless communication protocol are accomplished with a first transceiver and messages according to the second wireless communication protocol are accomplished with a second transceiver.

13. The method of claim 11, wherein messages according to the first wireless communication protocol and messages according to the second wireless communication protocol are accomplished with a single transceiver.

14. The method of claim 11 wherein the first communication wireless protocol comprises a synchronous protocol and the second wireless communication protocol comprises an asynchronous protocol.

15. The method of claim 11 wherein the first wireless communication protocol and the second communication wireless protocol comprise different ones of the following protocols: IEEE 802.11 direct sequence spread spectrum, IEEE 802.11 frequency hopping spread spectrum, SWAP, Bluetooth and HIPERLAN.

16. A machine-readable medium having stored thereon sequences of instructions that, when executed, cause one or more electronic systems to:
selecting a subset of entries from a set of entries that comprise a transaction policy, the selection based, at least in part, on a type of message to be transmitted according to a first wireless communication protocol;
selecting an entry from the subset of entries based, at least in part, on a type of message to be processed according to a second wireless communication protocol; and
controlling messages according to the first wireless communication protocol and messages according to the second wireless communication protocol based, at least in part, on the selected entry.

17. The machine-readable medium of claim 16, wherein messages according to the first wireless communication protocol are accomplished with a first transceiver and messages according to the second wireless communication protocol are accomplished with a second transceiver.

18. The machine-readable medium of claim 16, wherein messages according to the first wireless communication protocol and messages according to the second wireless communication protocol are accomplished with a single transceiver.

19. The machine-readable medium of claim 16 wherein the first wireless communication protocol comprises a synchronous protocol and the second wireless communication protocol comprises an asynchronous protocol.

20. The machine-readable medium of claim 16 wherein the first wireless communication protocol and the second wireless communication protocol comprise different ones of the following protocols: IEEE 802.11 direct sequence spread spectrum, IEEE 802.11 frequency hopping spread spectrum, SWAP, Bluetooth and HIPERLAN.

21. An electronic system comprising:
a bus;
a processor coupled with the bus;

a first transceiver coupled with the bus, the first transceiver to transmit/receive data according to a first wireless communication protocol;

a second transceiver coupled with the bus, the second transceiver to transmit/receive data according to a second wireless communication protocol;

a memory coupled with the bus, the memory to store a transaction control policy to indicate whether the first transceiver transmits/receives or the second transceiver transmits/receives if a conflict exists between the first wireless communication protocol and the second wireless communication protocol; and a control circuit coupled with the memory to receive at least a portion of the transaction control policy from the memory, wherein the portion of the transaction control policy received is based, at least in part, on a type of message to be transmitted by the first transceiver, wherein the control circuit is also coupled with the first transceiver and with the second transceiver, the control circuit to selectively enable/disable the first transceiver and to selectively enable/disable the second transceiver according to the portion of the transaction control policy.

22. The electronic system of claim 21 wherein the transaction control policy comprises a policy table and the apparatus further comprises a collision map.

23. The electronic system of claim 21 wherein the portion of the transaction control policy includes a set of entries, the control circuit to select an entry from the set of entries based on the state of the second transceiver, wherein the control circuit further comprises to selectively enable/disable the first transceiver and to selectively enable/disable the second transceiver according to the selected entry.

24. The electronic system of claim 21, wherein the first wireless communication protocol and the second wireless communication protocol comprise different ones of the following protocols: IEEE 802.11 direct sequence spread spectrum, IEEE 802.11 frequency hopping spread spectrum, Bluetooth, SWAP and HIPERLAN.

25. The electronic system of claim 21, wherein the first wireless communication protocol comprises a synchronous protocol and the second wireless communication protocol comprises an asynchronous protocol.

* * * * *